(12) United States Patent
Hahakura et al.

(10) Patent No.: US 9,764,463 B2
(45) Date of Patent: Sep. 19, 2017

(54) ROBOT

(71) Applicant: Seiko Epson Corporation, Tokyo (JP)

(72) Inventors: Seiji Hahakura, Azumino (JP); Kazushige Akaha, Azumino (JP); Sho Nakano, Matsumoto (JP); Takuya Owa, Matsumoto (JP); Kotaro Sekine, Matsumoto (JP); Daisuke Komatsu, Suwa (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/868,797

(22) Filed: Sep. 29, 2015

(65) Prior Publication Data

US 2016/0089779 A1 Mar. 31, 2016

(30) Foreign Application Priority Data

Sep. 30, 2014 (JP) .................. 2014-200029

(51) Int. Cl.
*B25J 17/00* (2006.01)
*B25J 9/10* (2006.01)
*B25J 9/04* (2006.01)
*B25J 19/00* (2006.01)

(52) U.S. Cl.
CPC .............. *B25J 9/104* (2013.01); *B25J 9/046* (2013.01); *B25J 9/102* (2013.01); *B25J 19/0029* (2013.01); *Y10S 901/19* (2013.01); *Y10S 901/20* (2013.01); *Y10S 901/21* (2013.01); *Y10S 901/25* (2013.01)

(58) Field of Classification Search
CPC ... B25J 9/104; B25J 9/046; B25J 9/102; B25J 19/0029; F16H 7/02

USPC ........ 74/490.01, 490.02, 490.03, 490.04, 29, 74/665 R; 901/15, 46

See application file for complete search history.

(56) References Cited

U.S. PATENT DOCUMENTS

| | | | | |
|---|---|---|---|---|
| 5,314,293 A | * | 5/1994 | Carlisle .................... | B25J 9/044 414/744.3 |
| 6,408,224 B1 | * | 6/2002 | Okamoto ............... | B25J 9/1661 29/721 |
| 6,599,412 B1 | * | 7/2003 | Graham ................. | C25D 17/06 205/123 |
| 6,622,585 B1 | * | 9/2003 | Salomonsson ....... | B25J 19/0029 248/68.1 |
| 6,634,851 B1 | * | 10/2003 | Bonora .................... | B25J 9/042 414/744.3 |

(Continued)

FOREIGN PATENT DOCUMENTS

| | | |
|---|---|---|
| DE | 2020-12011535 U1 | 1/2013 |
| DE | 202012011535 U1 | 1/2013 |

(Continued)

OTHER PUBLICATIONS

Extended European Search Report for Application No. EP15187344.5 dated Feb. 19, 2016 (9 pages).

*Primary Examiner* — Zakaria Elahmadi
(74) *Attorney, Agent, or Firm* — Harness, Dickey & Pierce, P.L.C.

(57) ABSTRACT

A robot includes: a base; an arm which is provided to be rotatable with respect to the base using a predetermined rotation shaft as the center of rotation; and an elongated object including a portion present in the base and in the arm, in which the elongated object is bound in a first binding position which is on the rotation shaft and in the base and a second binding position which is on the rotation shaft and in the arm.

7 Claims, 4 Drawing Sheets

(56) References Cited

U.S. PATENT DOCUMENTS

| | | | |
|---|---|---|---|
| 7,299,713 B2 | 11/2007 | Uematsu et al. | |
| 8,001,868 B2* | 8/2011 | Palau | B25J 9/044 74/490.02 |
| 2004/0261563 A1* | 12/2004 | Inoue | B25J 19/0025 74/490.03 |
| 2008/0282821 A1* | 11/2008 | Tokumitsu | B25J 9/042 74/29 |
| 2010/0180710 A1 | 7/2010 | Lee | |
| 2011/0252921 A1* | 10/2011 | Nakagiri | B25J 9/104 74/665 R |
| 2012/0060514 A1* | 3/2012 | Warhurst | F25D 13/04 62/3.6 |
| 2013/0102227 A1* | 4/2013 | Walsh | B24B 37/013 451/11 |
| 2013/0260606 A1* | 10/2013 | Hahakura | H01R 13/60 439/534 |
| 2014/0020498 A1 | 1/2014 | Adachi | |
| 2014/0309779 A1* | 10/2014 | Niu | B25J 9/046 700/258 |
| 2015/0192241 A1* | 7/2015 | Shannahan | F16M 11/2014 248/178.1 |
| 2015/0266185 A1* | 9/2015 | Sekine | B25J 13/088 74/490.01 |

FOREIGN PATENT DOCUMENTS

| | | |
|---|---|---|
| EP | 0621112 A1 | 10/1994 |
| EP | 1491300 A1 | 12/2004 |
| EP | 1930129 A1 | 6/2008 |
| EP | 2732938 A2 | 5/2014 |
| JP | S58-037373 A | 3/1983 |
| JP | H06-007923 B2 | 3/1994 |
| JP | H06-007923 Y2 | 3/1994 |
| JP | H06-143186 A | 5/1994 |
| JP | H06-190774 A | 7/1994 |
| JP | H07-124886 A | 5/1995 |
| JP | H07-136970 A | 5/1995 |
| JP | H07-246587 A | 9/1995 |
| JP | 2000-217297 A | 8/2000 |
| JP | 2002-011687 A | 1/2002 |
| JP | 2002-528287 A | 9/2002 |
| JP | 2004-276233 A | 10/2004 |
| JP | 2007-296631 A | 11/2007 |
| JP | 2008-223580 A | 9/2008 |
| JP | 2009-150475 A | 7/2009 |
| JP | 2013-179811 A | 9/2013 |
| JP | 2014-018929 A | 2/2014 |
| JP | 5523429 B2 | 6/2014 |

* cited by examiner

FIG. 4A

ROBOT

BACKGROUND

1. Technical Field

The present invention relates to a robot.

2. Related Art

In the related art, a robot including an arm which is rotatable with respect to a support such as a base. For example, Japanese Patent No. 5523429 discloses a configuration in which a rotary housing is rotatably supported by a support housing and a cable is inserted into a hollow crankshaft which rotates with the rotary housing. That is, the crankshaft includes openings which are formed on an upper surface and a side surface for passing the cable, the cable supported by the rotary housing is inserted into the crankshaft from the upper surface of the crankshaft, and the cable is drawn to the support housing from the side surface of the crankshaft.

As described in the related art, in a configuration in which the cable is inserted into the crankshaft, when the rotary housing rotates, a side wall of the crankshaft comes into contact with the cable, and when the rotary housing further rotates in a state where the side wall comes into contact with the cable, the cable is twisted and pulled by the side wall. Accordingly, it is difficult to provide a long life time of the cable.

SUMMARY

An advantage of some aspects of the invention is to provide a technology of providing a long life time of an elongated object (cable routing) used in a robot.

A robot according to an aspect of the invention includes: a base; an arm which is provided to be rotatable with respect to the base using a predetermined rotation shaft as the center of rotation; and an elongated object including a portion present in the base and in the arm, in which the elongated object is bound in a first binding position which is on the rotation shaft and in the base and a second binding position which is on the rotation shaft and in the arm.

That is, the elongated object including the portion present in the base and in the arm is bound in two positions on the rotation shaft of the arm. A binding position of the elongated object or a component bending the elongated object is not disposed between the first binding position and the second binding position which are the two positions. Accordingly, the elongated object is linear between the first binding position and the second binding position. In this configuration, the elongated object is twisted according to the rotation of the arm and is not pulled by other components. Therefore, it is possible to provide a long life time of the elongated object, compared to a configuration of operating a pulling force.

Herein, the base is a portion for installing the robot in an installation position and the arm is rotatably provided, and the elongated object is disposed therein. Any other elements configuring the robot may be attached to the inside or the outside of the base. For example, the motor or the reduction gear may be attached to the inside of the base.

It is sufficient that the arm is provided so as to be rotatable with respect to the base using a predetermined rotation shaft as the center of rotation. As the structure for rotating the arm, an arbitrary structure can be used, and for example, a structure of rotating the base and the arm relatively to each other can be used, by disposing a member including a portion present in the base and in the arm and which rotates using a rotation shaft as the center of rotation, and rotating the member by a driving unit such as a motor. Other members accompanied with the rotation, such as a reduction gear, may be included, for example.

It is sufficient that the elongated object includes a portion present in the base or in the arm. That is, the elongated object which is a member transmitting an arbitrary transmission target is wound so as to include the portion present in the base and in the arm, in order to transmit the transmission target from the base side to the arm side and/or from the arm side to the base side. Various targets can be assumed as the transmission target of the elongated object, power, signals, or fluid is assumed. When the power or signals are the transmission target, the elongated object is a conductor and when the fluid is the transmission target, the elongated object is a piping. The number of elongated objects may be plural and the types of the elongated object may also be plural.

In addition, the elongated object is bound in the first binding position which is on the rotation shaft of the arm and in the base and the second binding position which is on the rotation shaft of the arm and in the arm. That is, the elongated object may be disposed along the rotation shaft by binding the elongated object in two places on the rotation shaft. The first binding position and the second binding position are positions regulated so that the elongated object passes through the positions, and each position may have a range so that a change occurring in the elongated object due to rotation of the arm is mainly twisting, as much as possible. For example, the elongated object may be fixed to the first binding position and the second binding position and the elongated object may be regulated so as to exist in a predetermined range as the first binding position and the second binding position. That is, as long as the twisting is mainly operated on the elongated object, it is possible to adjust strength of binding the elongated object in the first binding position and the second binding position. As a method of performing the binding, various methods can be used, and the elongated object may be bound in a binding target portion present in the base or a binding target portion present in the arm by a binding band or an arbitrary clamping unit.

The rotation shaft may be parallel to a vertical direction. That is, the invention may be applied to a robot in which an arm rotates with respect to a rotation shaft parallel to the vertical direction. When the rotation shaft is parallel to the vertical direction, the elongated object present between the first binding position and the second binding position is disposed on the rotation shaft by its own weight and autonomously has a linear shape, even when the elongated object is bound in the first binding position and the second binding position which are two positions on the rotation shaft. Accordingly, it is possible to provide a long life time of the elongated object with a simple configuration. Even when the rotation shaft is not parallel to the vertical direction, it is possible to provide a long life time of the elongated object, when the elongated object is bound so as to be linear on the rotation shaft.

The robot may further include a hollow rotation shaft member which includes a portion present in the base and in the arm and rotates using the rotation shaft as the center of rotation, and the elongated object may pass through the hollow portion of the rotation shaft member. That is, when the arm rotates using the rotation shaft as the center of rotation and the rotation shaft does not exist in the hollow portion, it is difficult to dispose the elongated object on the rotation shaft. Therefore, by using a configuration in which the elongated object passes through the hollow portion of the rotation shaft member, it is possible to easily dispose the elongated object on the rotation shaft.

The rotation shaft member is a member which includes a portion present in the base and in the arm and uses the shaft of the hollow portion as the rotation shaft of the arm, and can be configured by a cylindrical member, for example. The rotation shaft member may be a member which directly or indirectly rotates by a rotation force of a motor.

The robot may further include a reduction gear including a hollow axis which is attached to at least one of the base and the arm, and the rotation shaft member may penetrate through the hollow axis of the reduction gear. That is, the rotation shaft member is a member using the shaft of the hollow portion as the rotation shaft of the arm and has a typical cylindrical shape. Meanwhile, when the configuration portion of the robot is driven by the driving unit such as a motor, it is difficult to control the speed of the rotation of the arm, by only directly transmitting the rotation of the output shaft of the motor to each configuration portion by a pulley or the like. Therefore, when the rotation driving force of the motor is reduced through the reduction gear and transmitted to the arm, it is possible to adjust the rotation rate according to a reduction ratio and it is easy to control the rotation of the arm. In a case of the reduction gear including a hollow shaft, the rotation shaft member through which the elongated object passes is disposed so as to penetrate the hollow shaft of the reduction gear, and accordingly, it is possible to easily realize the configuration in which the elongated object passes on the rotation shaft.

A motor including an output shaft facing the upper portion in the vertical direction, a motor pulley which is attached to the output shaft, a rotation shaft member pulley through which the rotation shaft member penetrates, and a belt attached to the motor pulley and the rotation shaft member pulley may be included in the base, and the reduction gear and the arm may exist directly upwards with respect to the rotation shaft member pulley. That is, in a configuration of transmitting the rotation driving force of the motor to the rotation shaft member through a motor pulley, a rotation shaft member pulley, and a belt, the motor may be disposed vertically downward through the belt and the arm may be disposed directly upward.

According to this configuration, the arm and the motor are not lined on the vertical line, and a lower space of the arm can be used as a space where components other than the motor exist. Accordingly, it is possible to increase a length of the elongated object including a portion present in the base and in the first arm, which extends along the rotation shaft. As the length of the elongated object extending in a linear shape is long, it is possible to prevent secular change in a case where the elongated object is twisted, and it is possible to provide a long life time of the elongated object.

The motor may be a device in which the rotation driving force is used by the output shaft, and the output shaft faces directly upwards, in order to transmit the rotation driving force of the output shaft to the arm through the belt, and as a result, the rotation shaft of the rotation shaft member and the output shaft may be parallel to each other. The motor pulley and the rotation shaft member pulley may be formed at a predetermined change gear ratio (radius ratio) so that the rotation driving force of the output shaft of the motor can be transmitted to the rotation shaft member. The belt may transmit the rotation driving force of the output shaft to the rotation shaft member through each pulley, and the belt may be configured with a material or a structure so as not to run idle on the pulley. In the rotation shaft member pulley, the rotation shaft member may penetrate the hole of the rotation shaft member pulley. That is, the shaft of the hole of the rotation shaft member pulley and the shaft of the rotation shaft member may coincide with each other. The rotation shaft member pulley may be attached to the rotation shaft member or attached to a member of the periphery of the rotation shaft member. In the latter case, a configuration can be assumed that the rotation shaft member pulley and the rotation shaft member are not directly connected and the rotation shaft member pulley is directly connected to the reduction gear described above.

The robot may further include a motor brake which is attached to the output shaft in a portion directly upward with respect to the motor pulley and prevents the rotation of the output shaft. That is, it is necessary to attach the motor brake to the motor, in order to stop the rotation (or prevent rotation) of the output shaft of the motor at an arbitrary timing. In a configuration in that the rotation driving force of the motor is transmitted to the arm through the motor pulley, the rotation shaft member pulley, and the belt, when the motor is disposed vertically downward through the belt and the arm is disposed vertically upward, the reduction gear and the arm are disposed at a position different from the directly upper portion of the motor by the belt. Accordingly, the entire height of the base does not change, even when a member smaller than the reduction gear is disposed over the motor. Since it is easy to configure the motor brake which is smaller than the reduction gear, by configuring the motor brake vertically upwards with respect to the motor pulley, it is possible to configure the base including the motor brake, without increasing the size of the base.

A removal prevention member for preventing removal of a bearing of the rotation shaft member pulley may be attached to the rotation shaft member in a portion vertically downwards with respect to the rotation shaft member pulley. That is, the rotation shaft member pulley includes a bearing existing between the rotation shaft member and the main body of the rotation shaft member pulley, but when the rotation shaft of the rotation shaft member is parallel to the vertical direction, the bearing may be removed downwards due to the gravitation. Therefore, when the removal prevention member which prevents the removal of the bearing is attached to the rotation shaft member, it is possible to prevent the removal of the bearing, even when the rotation shaft member pulley rotates at a high speed. In addition, it is also possible to prevent the removal of the rotation shaft member pulley.

The robot may further include a circular sealing member for preventing leakage of oil in the reduction gear; and a circular removable member which is detachable from the reduction gear and is attached to the reduction gear in a state of being penetrated by the rotation shaft member to be disposed between the sealing member and the reduction gear. That is, the reduction gear is configured in combination of a plurality of movable components such as a component including teeth for interlocking members with each other, a gear wheel, or the like and seals lubricant therein, in order to smoothly operate while contacting each movable component. The sealing member is used for preventing the leakage of the lubricant, but it is necessary to rigidly attach the sealing member to the reduction gear in order to prevent removal of the sealing member in a managing process.

However, in a configuration in that the sealing member is rigidly attached to the reduction gear, it is difficult to detach the sealing member singly for maintenance and it is necessary to disassemble the reduction gear. Therefore, the circular removable member is configured to be detachable from the reduction gear. In addition, the removable member is attached to the reduction gear in a state where the rotation shaft member penetrates through the removable member to be disposed between the sealing member and the reduction gear. According to this configuration, by removing the removable member from the reduction gear, it is possible to also remove the seal member at the same time and it is not necessary to disassemble the reduction gear. Various configurations can be used as the configuration of removing the removable member, and a configuration in that a specialized tool for removing is attached to the removable member by bolt or the like and a force for removing the removable member is applied to the specialized tool.

The robot may further include a driving unit which exists in the base and rotates the arm, the base may include an opening and a cover which is attachable to the opening, the cover may include an elongated object connection unit for connecting the elongated object existing in the base to a connection portion of the outside of the base, the elongated object may contain a piping for flowing fluid, the elongated object connection unit may contain a joint to which the piping is connected, and the driving unit may not exist in an extended edge of the joint of the cover attached to the opening.

That is, when the driving unit exists in the base and the elongated object comes into contact with the driving unit, the life time may be shortened by damaging the elongated object due to the driving of the driving unit. When the driving unit exists in the extended edge of the elongated object connection unit in a state where the cover is attached to the opening, it is necessary to curve the elongated object in the base for avoiding the driving unit. The piping as the elongated object is difficult to be sharply bent in order to ensure flow of fluid in the piping. Therefore, in a configuration where the driving unit does not exist in an extended edge of the joint of the cover attached to the opening, it is possible to prevent the bending of the piping in order to avoid the driving unit, and to prevent reduction in life time of the piping.

The driving unit may be a portion for driving the arm and is a portion driven by the motor, the reduction gear, the rotation shaft member, the pulley, or the rotation of arm. In addition, a state where the driving does not exist in an extended edge of a connector for connecting the elongated object other than the piping (for example, piping formed of conductor or the like) to the cover may be realized.

The robot to which the invention is applied may be provided as a robot system including a control unit which controls the robot or perform corporation with various devices, and various configurations can be used.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1A:
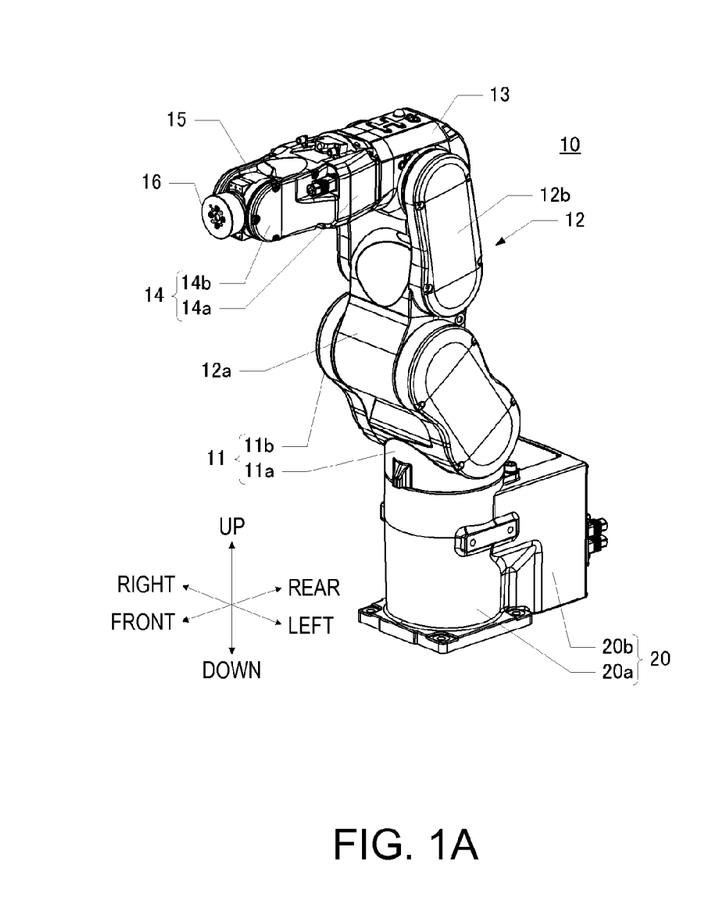
FIG. 1A is a diagram showing a robot according to the embodiment of the invention and FIG. 1B is a sectional view of a base and a first arm.

Herein, embodiments of the invention will be described in the following order.
1. Configuration of Robot
2. Arrangement of Elongated Object of First Arm and Base
3. Configuration of Periphery of Rotation Shaft Member
4. Other Embodiments 1. Configuration of Robot FIG. 1A is a diagram showing a configuration of a robot 10 which is one embodiment of the invention. The robot 10 according to the embodiment includes a plurality of arms 11 to 16 and a base 20. In this specification, the arms are distinguished by applying reference numerals from the base 20 side. That is, the first arm 11 is rotatably supported by the base 20 and a second arm 12 is rotatably supported by the first arm 11. In addition, a third arm 13 is rotatably supported by the second arm 12, a fourth arm 14 is rotatably supported by the third arm 13, a fifth arm 15 is rotatably supported by the fourth arm 14, and a sixth arm 16 is rotatably supported by the fifth arm 15. The rotation of each arm is realized by a motor (not shown) or the like which is provided in the inside of the base 20 or the arm. In the embodiment, an end effector (not shown) can be attached to the sixth arm 16.

In FIG. 1A, in the robot 10, the base 20 is positioned at an installation location and is installed by fastening the robot in the installation location with a bolt or the like. In this specification, directions are set so that directions vertical to a plane where the base 20 is installed are set as upward and downward and a direction where a main driving range of each arm is present in the plane where the base 20 is installed is set as a front side, and the directions are noted in FIG. 1A. Hereinafter, directions such as upwards, downwards, and front, rear, right, and left directions are based on the directions shown in FIG. 1A.

The base 20 substantially has a shape obtained by connecting a main body 20a having an approximately cylindrical shape and a rectangular portion 20b having an approximately rectangular shape, and the main body 20a is disposed on the front side and the rectangular portion 20b is disposed on the rear side, in FIG. 1A. On the upper portion of the main body 20a, the first arm 11 is supported by the main body 20a so as to rotate using a rotation shaft extending in a vertical direction of FIG. 1A as the center of rotation. The first arm 11 includes a main body 11a and a support 11b and the main body 11a is supported by the base 20 in a state where the main body 11a is disposed over the main body 20a of the base 20. The support 11b is a portion which interposes the second arm 12 for support. The second arm 12 includes a main body 12a and a support 12b and is supported by the support 11b so that the main body 12a can rotate using a rotation shaft extending in a horizontal direction of FIG. 1A as the center of rotation in a state where the main body 12a is interposed by the support 11b. The support 12b is a portion which interposes the third arm 13 for support.

The third arm 13 has an approximately rectangular parallelepiped shape and is supported by the support 12b so that the third arm 13 can rotate using a rotation shaft extending in the horizontal direction shown in FIG. 1A as the center of rotation in a state where the third arm is interposed by the support 12b. The fourth arm 14 is supported on an end surface (end surface at the front in a state shown in FIG. 1A) of the third arm so that the fourth arm 14 can rotate by the rotation shaft which is parallel to a direction (a front and rear direction in a state shown in FIG. 1A) vertical to the rotation shaft (the horizontal direction in a state shown in FIG. 1A) of the third arm 13.

The fourth arm 14 includes a main body 14a and a support 14b and is supported by the third arm 13 so as that the main body 14a can rotate using a rotation shaft extending in the front and rear direction of FIG. 1A. That is, in the embodiment, a direction in which the fourth arm 14 extends and a direction in which the rotation shaft extends are parallel to each other and the fourth arm 14 can be twisted. The support 14b is a portion which interposes the fifth arm 15 for support. The fifth arm 15 is supported by the support 14b so as to rotate using a rotation shaft extending in the horizontal direction of FIG. 1A as the center of rotation in a state where the fifth arm 15 is interposed by the support 14b. The sixth arm 16 is supported by the fifth arm so as to rotate using a rotation shaft extending in the front and rear direction of FIG. 1A as the center of rotation. That is, the sixth arm 16 is also configured to be twisted.

A plurality of elongated objects for transmitting power, signals, or fluid (air) to other portions can be connected to the base 20. That is, these elongated objects are connected to the base 20, the elongated objects are drawn in the inside of the base 20, and power, signals, and fluid are transmitted to and used in the base 20 or an arbitrary arm of the first arm 11 to sixth arm 16.

Figure 1B:
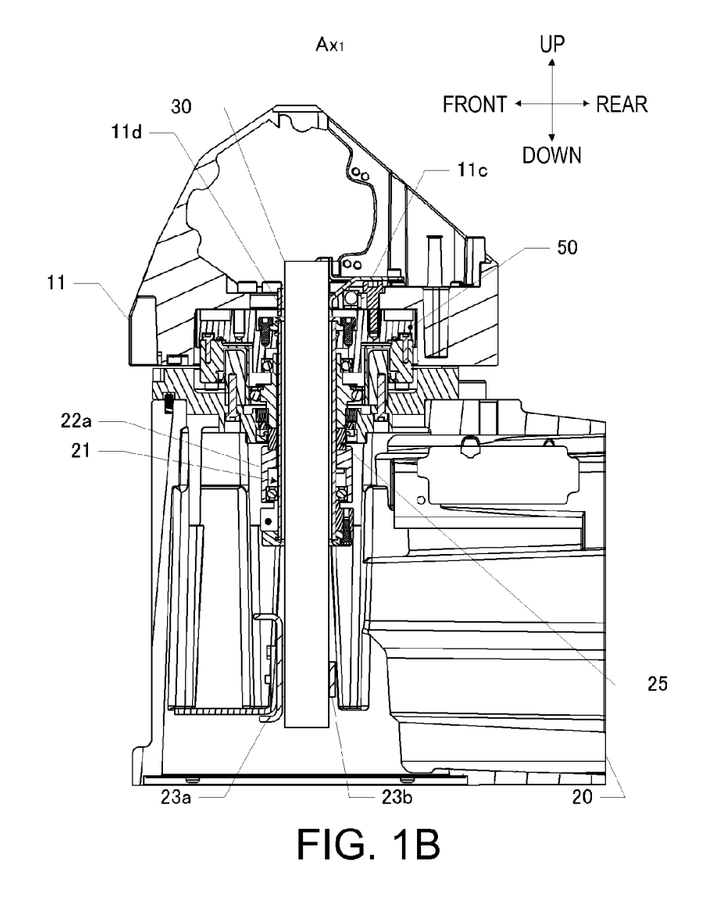
Figure 2A:
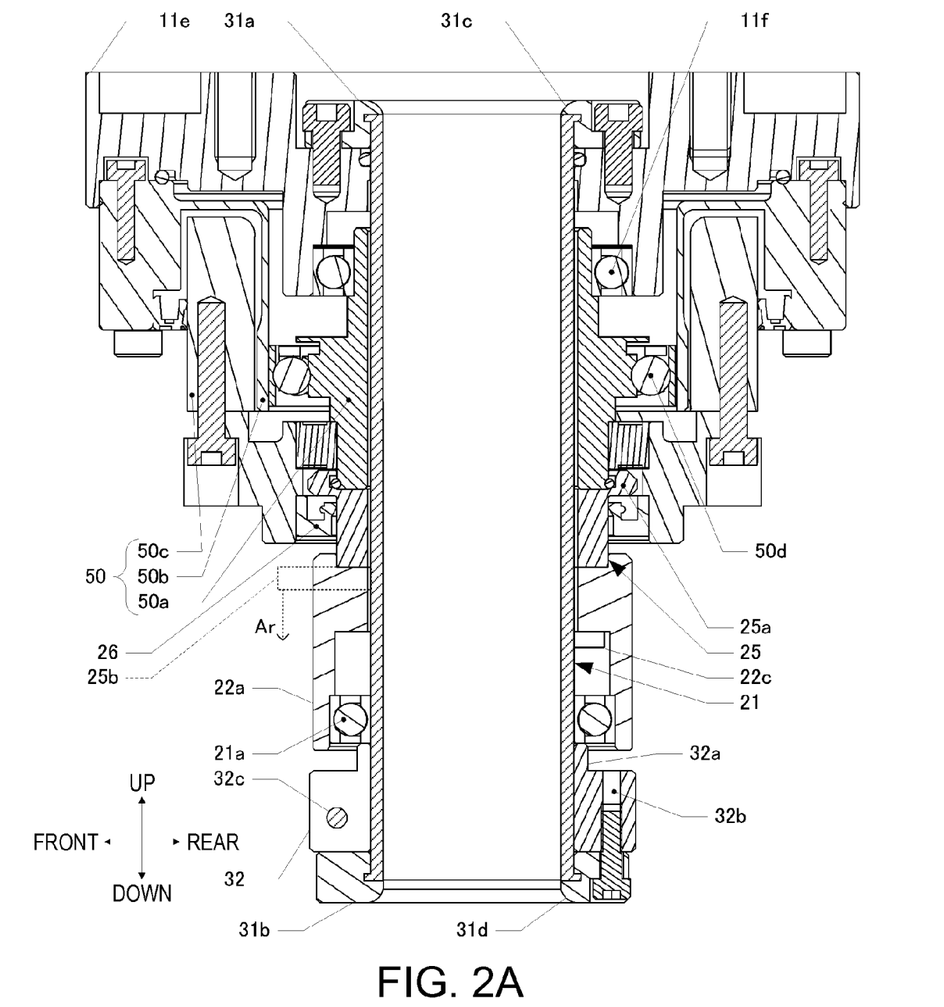
FIG. 2A is an enlarged sectional view of a periphery of a reduction gear and FIG. 2B is a perspective view of a removable member.

FIG. 1B is a sectional view showing a configuration of the inside of the base 20 and the inside of the first arm 11 relating to the rotation of the first arm 11, in a state where the base 20 and the first arm 11 are sectioned in the front and rear direction shown in FIG. 1A (herein, the extracted part of only the lower part of the first arm 11 is shown). FIG. 2A is a diagram showing extracted and enlarged periphery members of a reduction gear 50 and a rotation shaft member 21. In the embodiment, the first arm 11 is disposed on the vertically upper portion of the base 20 and the first arm 11 is supported so as to rotate with respect to the center shaft of the rotation shaft member 21 which has a portion present in the base 20 and in the first arm 11. That is, the rotation shaft member 21 is a cylindrical member and is disposed in the base 20 and the first arm 11 so that the shaft of the cylindrical becomes a rotation shaft $Ax_1$ which is the center of the rotation of the first arm 11.

A mechanism for transmitting a rotation driving force of a motor to the first arm 11 is disposed on the periphery of the rotation shaft member 21. In the embodiment, the mechanism is configured by a rotation shaft member pulley 22a, a removable member 25, and the reduction gear 50. In the embodiment, the reduction gear 50 is a wave gearing device and includes a wave generator 50a, a flexspline 50b, and a circular spline 50c.

The rotation shaft member pulley 22a has an inner diameter which is slightly greater than the outer diameter of the rotation shaft member 21 and is attached to a portion which is slightly lower than the center of the rotation shaft member 21 in the vertical direction through a bearing 21a. The rotation shaft member pulley 22a rotates by rotating by a rotation driving force of a motor (not shown) disposed in the base 20. That is, a belt is applied to the rotation shaft member pulley 22a and a motor pulley (not shown) is further applied to the belt. The motor pulley is connected to an output shaft of a motor and the rotation driving force is transmitted to the rotation shaft member pulley 22a through the motor pulley and the belt by the rotation driving of the motor. In FIG. 1B, the motor and the motor pulley are omitted, but the motor and the motor pulley are disposed on a rectangular portion 20b (see FIG. 1A) in the base 20.

A rotation rate of the first arm 11 of the embodiment is adjusted by the reduction gear 50 so that the first arm rotates at a rotation rate which is suitable for the rotation of the first arm 11. That is, in the embodiment, the rotation shaft member pulley 22a is connected to the removable member 25 by a bolt 22c and the removable member 25 is connected to the wave generator 50a by the bolt 22c. Accordingly, the rotation shaft member pulley 22a, the removable member 25, and the wave generator 50a do not rotate relatively, but rotate integrally.

The wave generator 50a includes a bearing 50d and the flexspline 50b is attached to the outer periphery side of the bearing 50d. The flexspline 50b is configured so as to be engaged with the circular spline 50c. The circular spline 50c is fixed to the base 20 by a bolt. In addition, the flexspline 50b is fixed to a flange 11e by a bolt. The flange 11e is a configuration member of the first arm 11 and is fixed to the main body 11a of the first arm 11 by a bolt.

The outer periphery of the wave generator 50a is in an elliptical shape (the outer periphery in a view from the top is elliptical). The flexspline 50b has a cylindrical portion which is a thin wall surface and is attached so that the wave generator 50a is fitted to the inner periphery of the wall surface. Accordingly, when the wave generator 50a rotates using the rotation shaft $Ax_1$ as the center of rotation, the shape of the thin wall surface of the flexspline 50b is elastically deformed according to the shape of the outer periphery of the wave generator 50a. The teeth are provided on the outer periphery of the flexspline 50b and the teeth are also provided on the inner periphery of the circular spline 50c. Accordingly, the flexspline 50b is in a state of being engaged with the circular spline 50c in a long axis portion of the elliptical shape. The numbers of teeth on both components are different from each other by n (n is a natural number equal to or greater than 1). When the wave generator 50a rotates one revolution, the ellipse rotates while the flexspline 50b and the circular spline 50c are engaged with each other in the long axis portion of the ellipse, and the wave generator 50a and the flexspline 50b relatively rotate by an angle according to the difference in the number of teeth in the one revolution of the ellipse. In the embodiment, the reduction gear 50 makes the flexspline 50b rotate while reducing the rotation rate of the wave generator 50a, with the configuration described above.

In the embodiment, the first arm 11 is rotated by the rotation driving force of the motor with the configuration described above. That is, when the rotation shaft member pulley 22a rotates by the rotation driving force of the motor, the removable member 25 and the wave generator 50a connected to the rotation shaft member pulley 22a integrally rotate. As described above, when the wave generator 50a rotates, the rotation is transmitted to the flexspline 50b while reducing the rotation rate, but the flexspline 50b is connected to the flange 11e, and accordingly, the flange 11e (that is, the first arm 11) rotates using the rotation shaft $Ax_1$ as the center of rotation by the number of rotations after reducing the rotation rate.

In the embodiment, the rotation shaft member 21 is fixed to the flange 11e using an upper end portion of the rotation shaft member 21. Specifically, portions of an upper end and a lower end of the rotation shaft member 21 are slightly protruded in a direction vertical to the vertical direction to form a part having a flange shape. Circular elongated object protection members 31a and 31b are attached to the protruded part. The elongated object protection members 31a and 31b have an inner diameter which is slightly greater than an outer diameter of the rotation shaft member 21 and grooves for inserting the flange-shaped parts of the upper end and the lower end of the rotation shaft member 21 are formed on the side wall which forms the inner diameter.

Bolt holes penetrating in a direction parallel to the inner wall are formed on the elongated object protection members 31a and 31b and the elongated object protection member 31a is fixed to the flange 11e through the bolt hole on the upper end of the rotation shaft member 21. Accordingly, the rotation shaft member 21 rotates with the rotation of the flange 11e. This configuration is merely an example and the rotation shaft member 21 may be directly fixed to the flange 11e.

Meanwhile, the elongated object protection member 31b is fixed to a removal prevention member 32 through the bolt hole on the lower end of the rotation shaft member 21. The removal prevention member 32 has a cylindrical shape and includes a protrusion 32a which is protruded upwards. The removal prevention member 32 includes a bolt hole 32b for inserting a bolt in the vertical direction and a bolt hole 32c for inserting a bolt in a direction vertical to the vertical direction. The removal prevention member 32 is fixed to the rotation shaft member 21 by inserting a bolt into the bolt hole 32c in a state where the upper end of the protrusion 32a comes into contact with the lower end of the bearing 21a. The removal prevention member 32 is fixed to be formed integrally with the elongated object protection member 31b by inserting a bolt to the bolt hole 32b.

Portions 31c and 31d which are positioned on the upper end of the inner wall of the elongated object protection member 31a and the lower end of the inner wall of the elongated object protection member 31b are curved surfaces having an inner diameter which gradually increases towards the outer side (upper end side or lower end side), in a state where the elongated object protection members 31a and 31b are fixed to the rotation shaft member 21.

2. Arrangement of Elongated Object of First Arm and Base

In the configuration described above, the shaft of the rotation shaft member 21 penetrates the hollow shaft of the reduction gear 50, and the shaft of the rotation shaft member 21, the shaft of the reduction gear 50, and the rotation shaft $Ax_1$ of the first arm 11 coincide with each other. In the embodiment, the rotation shaft member 21 is disposed in the base 20 and the first arm 11 so that the rotation shaft $Ax_1$ is parallel to the vertical direction (vertical direction when the base 20 is installed on a horizontal plane). That is, the reduction gear 50 of the embodiment includes a hollow shaft and the rotation shaft member 21 penetrates the hollow shaft of the reduction gear 50.

In the embodiment, an elongated object 30 passes through the hollow portion of the rotation shaft member 21. That is, as shown in FIGS. 1B and 2A, the rotation shaft member 21 is a hollow cylindrical body and the elongated object 30 passes through the hollow portion which is the inside of the rotation shaft member (see FIG. 1B). Accordingly, the elongated object 30 is present over the base 20 and the first arm 11 and has a part which is present in the base 20 and in the first arm 11. The elongated object 30 is an elongated object which is drawn in the base 20 and in the first arm 11 and is configured by binding elongated objects which transmit power, signals, and fluid from the outside to the inside of the base 20 or from the inside to the outside.

The elongated object 30 is bound on at least one portion in the base 20 and at least one portion in the first arm 11. In the embodiment, the elongated object is united on a first binding position which is on the rotation shaft $Ax_1$ and in the base 20 and a second binding position which is on the rotation shaft $Ax_1$ and in the first arm 11. Other binding positions do not exist between the first binding position and the second binding position. Specifically, as shown in FIG. 1B, a plate shaped member 23a is connected to the base 20 on the lower portion in the base 20. A binding tool 23b which can be fastened to the plate shaped member 23a is previously provided, while coming into contact with a part of the outer periphery of the elongated object 30 and the plate-like surface of the plate shaped member 23a, and the binding tool 23b is fastened to the plate shaped member 23a in a state where the elongated object 30 is disposed between the plate shaped member 23a and the binding tool 23b. As a result, the elongated object 30 is bound in the base 20 using the position of the binding tool 23b as the first binding position.

Meanwhile, as shown in FIG. 1B, a plate shaped member 11c is connected to the first arm 11 on the lower portion in the first arm 11. A binding tool 11d which can be fastened to the plate shaped member 11c is previously provided, while coming into contact with a part of the outer periphery of the elongated object 30 and the plate-like surface of the plate shaped member 11c, and the binding tool 11d is fastened to the plate shaped member 11c in a state where the elongated object 30 is disposed between the plate shaped member 11c and the binding tool 11d. As a result, the elongated object 30 is bound in the first arm 11 using the position of the binding tool 11d as the second binding position. The binding method in the first binding position and the second binding position is merely an example and other methods may be used. For example, the elongated object 30 may be bound by an operation of a flat spring by interposing the elongated object 30 by the plate shaped member.

In the embodiment, the plate shaped member 23a, the binding tool 23b, the plate shaped member 11c, and the binding tool 11d are disposed on a position where the elongated object 30 can be bound on the rotation shaft $Ax_1$ of the rotation shaft member 21. Accordingly, in the embodiment, the elongated object 30 is bound on the first binding position and the second binding position on the rotation shaft $Ax_1$. Since the rotation shaft $Ax_1$ is linear line, the elongated object 30 is a linear shape between the first binding position and the second binding position.

In the embodiment, the vicinity of the rotation shaft of the reduction gear 50 is hollow and the elongated object is configured by disposing the rotation shaft member 21 in the hollow portion. Since the rotation shaft member 21 is a cylindrical member, the elongated object can be easily disposed on the rotation shaft $Ax_1$ by passing the elongated object 30 through the inside of the rotation shaft member 21. In the embodiment, the rotation shaft $Ax_1$ is parallel to the vertical direction. Accordingly, even when the elongated object 30 is bound in the first binding position and the second binding position which are two positions on the rotation shaft $Ax_1$, the elongated object 30 existing in the first binding position and the second binding position is disposed on the rotation shaft $Ax_1$ by its own weight. Therefore, the elongated object 30 autonomously has a linear shape. Thus, it is possible to provide a long life time of the elongated object 30 with a simple configuration.

In the configuration described above, when the first arm 11 rotates with respect to the base 20, the elongated object 30 is twisted according to the rotation of the first arm 11. However, in the embodiment, since a crank shaft for pulling the first arm 11 with the rotation does not exist, the elongated object 30 is not pulled by a component which is the crank shaft. Therefore, it is possible to limit large portions of a force operating on the elongated object 30 to stress generated due to twisting, in comparison with a structure where a pulling force by the crank shaft is operated. As a result, it is possible to provide a long life of the elongated object 30.

In the embodiment, the elongated object protection members 31a and 31b are attached to the upper end portion and the lower end portion of the rotation shaft member 21, and portions 31c and 31d which are positioned on the upper end of the inner wall of the elongated object protection member 31a and the lower end of the inner wall of the elongated object protection member 31b are curved surface having an inner diameter which gradually increases towards the outer side (upper end side from the inside and lower end side from the inside). Accordingly, a contact surface of the elongated object 30 which comes into contact with the vicinity of the upper end and the lower end of the rotation shaft member 21 is curved, and a degree of damaging the elongated object 30 by contacting the elongated object protection members 31a and 31b by the elongated object 30 is prevented. Therefore, it is possible to provide a long life of the elongated object 30.

The portions 31c and 31d of the elongated object protection members 31a and 31b or the inner wall of the rotation shaft member 21 may be coated with a material having comparatively small frictional resistance, for example, a fluorine resin. According to this configuration, a degree of damaging the elongated object 30 by the contacting with respect to the elongated object 30 is prevented. Therefore, it is possible to provide a long life of the elongated object 30.

Figure 2B:
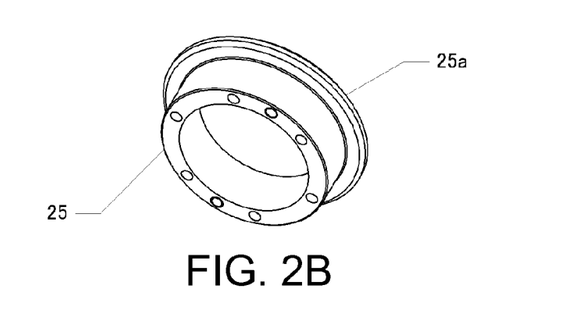

The first binding position or the second binding position is not limited to the positions shown in FIGS. 1B and 2B and may be changed according to the life time of the elongated object 30. That is, it is possible to provide a long life of the elongated object 30 by increasing the distance between the first binding position and the second binding position.

3. Configuration of Periphery of Rotation Shaft Member

The elongated object 30 in the base 20 is generally thicker (is bound and becomes thick) than the elongated object in other arms. Accordingly, the inner diameter of the rotation shaft member 21 is necessarily sufficiently great, in order to pass the thick elongated object 30 through the inside of the rotation shaft member 21. In addition, as described above, it is necessary to increase the distance between the first binding position and the second binding position, in order to provide a long life of the elongated object 30.

The rotation shaft member may be generally held at two places of a cylinder, in order to dispose the cylindrical rotation shaft member so as to rotate around the rotation shaft, but in the embodiment, the rotation shaft member 21 is generally held at three places, that are, the bearings 21a, the bearings 50d, and bearings 11f, in order to dispose the thick and long rotation shaft member 21 in the base 20. Herein, the bearings 50d and 11f are set not to be removed in relation to circumferential components, but the bearing 21a may be removed due to the rotation of the rotation shaft member pulley 22a when other members are not disposed directly under the bearing 21a. Therefore, in the embodiment, as shown in FIG. 2A, the removal prevention member 32 is attached to the rotation shaft member 21 in the vertically lower portion of the rotation shaft member pulley 22a. The removal prevention member 32 is attached to the rotation shaft member 21 so that the protrusion 32a protruded upward comes into contact with the bearing 21a (constituent element of at least the bearing 21a). Herein, since the removal prevention member 32 is fixed to the rotation shaft member 21 by the bolt hole 32c, the removal prevention member 32 is not removed to the lower portion, even when the rotation shaft member 21 rotates at a high speed. Accordingly, the removal prevention member 32 operates so as to prevent the removal of the bearing 21a of the rotation shaft member pulley 22a.

The removable member 25 is configured so as to prevent leakage of oil in the reduction gear 50 without disassembling the reduction gear 50, by combining and using a sealing member 26 for preventing the leakage of oil. That is, in the embodiment, the sealing member 26 is not directly attached to the wave generator 50a and is attached to the removable member 25 in a state where the removable member 25 is disposed between the sealing member 26 and the wave generator 50a.

That is, the reduction gear 50 is configured by combining a plurality of movable components and seals lubricant therein, in order to smoothly operate while contacting each movable component. The sealing member 26 is used for preventing the leakage of the lubricant, but it is necessary to rigidly attach the sealing member 26 to the reduction gear 50 in order to prevent removal of the sealing member 26 in a managing process while using the removable member 25. However, in a configuration in that the sealing member 26 is directly and rigidly attached to the reduction gear 50, it is difficult to detach the sealing member 26 singly for maintenance and it is necessary to disassemble the reduction gear 50.

Therefore, in the embodiment, the removable member 25 is configured so as to be detachable from the reduction gear 50. That is, the removable member 25 is a circular member which is detachable from the reduction gear 50 and is attached to the reduction gear 50 in a state where the rotation shaft member 21 penetrates therethrough. Specifically, a claw portion 25a is formed on the upper portion of the removable member 25 and the claw portion 25a is attached to be embedded in the outer wall of the wave generator 50a. The circular sealing member 26 for preventing the leakage of oil in the reduction gear 50 is attached between the outer wall of the removable member 25 and the base 20, in a state where the removable member 25 is attached to the wave generator 50a. The sealing member 26 can be fit to the removable member 25 so that the oil in the reduction gear 50 is not leaked downwards. According to this configuration, it is possible to prevent leakage of oil in the reduction gear 50 in a managing process by the sealing member 26.

The removable member 25 may be detachable from the wave generator 50a and various methods can be used as a method of detaching the removable member. In the embodiment, it is configured so as to perform the detaching by attaching another component to the removable member 25. For example, it is possible to detach the removable member 25 using the plate shaped member 25b (see a broken line of FIG. 2A) where the bolt hole is formed. That is, the removable member 25 includes a plurality of bolt holes as shown in FIG. 2B, and when a force in an arrow Ar direction is operated on the plate shaped member 25b in a state where the plate shaped member is connected using the bolt and a bolt hole formed on the plate shaped member 25b, it is possible to detach the removable member 25 with the sealing member 26. According to the configuration described above, it is possible to detach the removable member 25 and the sealing member 26 from the reduction gear 50 without disassembling the reduction gear 50. Since the sealing member 26 is a member which rotates with the removable member 25, the sealing member is preferably a rubber material having high heat resistance and is preferably configured with a fluorine resin, for example.

4. Other Embodiments

The embodiment hereinabove is an example for realizing the invention and various other configurations can be exemplified, in addition thereto. For example, the configuration of the robot 10 is not limited to the configuration shown in FIG. 1A and the robot may be any other robots such as a double-arm robot, a humanoid robot, or a SCARA robot. The configuration of arms is not limited to the configuration shown in FIG. 1A either, and a 7-axis robot including seven arms may be used, and the number of arms is not limited.

Figure 3A:
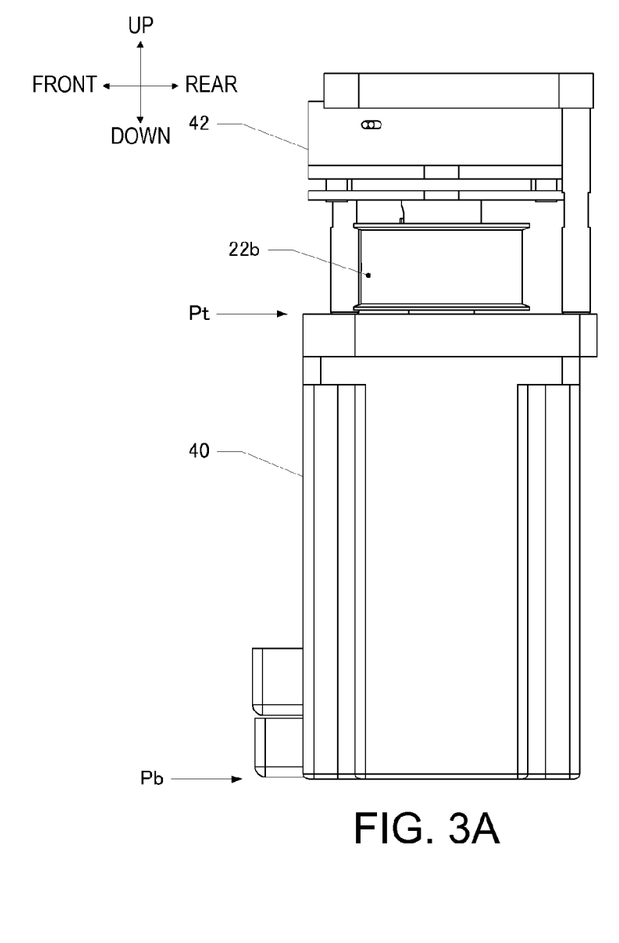
FIG. 3A is a diagram showing a motor and FIG. 3B is a sectional view of the motor.
Figure 3B:
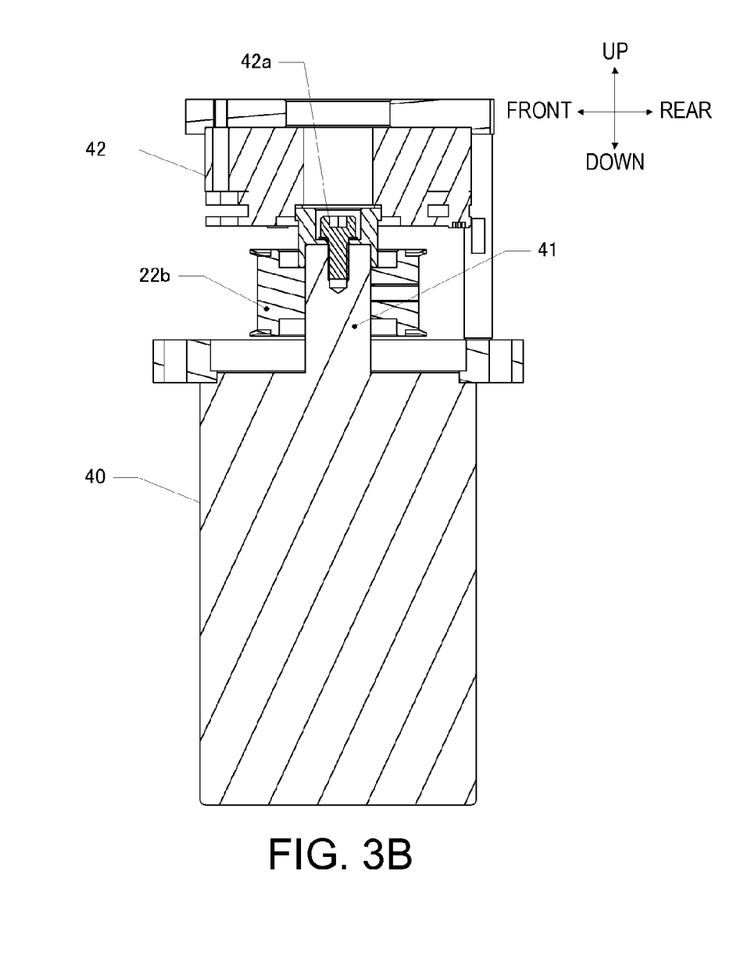

Various inventions may be applied to various components included in the base of the robot 10. In many cases, a small size of the robot 10 is preferable than a big size thereof, and accordingly, the invention for realizing miniaturization may be applied. For example, it is possible to miniaturize the base by disposing a brake of a motor in the base in a manner different from the general disposition. FIGS. 3A and 3B are diagram showing a motor 40 included in the base and extracted members relating to the motor 40. FIG. 3A shows a state of the motor 40 in the base when seen from the left side to the right side shown in FIG. 1A and FIG. 3B is a sectional view of FIG. 3A. In the drawings, the same reference numerals are used for the same configuration as that of the robot 10 shown in FIG. 1A.

The motor 40 shown in FIGS. 3A and 3B includes a housing which is long in one direction is attached to the base in a state where the longitudinal direction faces the vertical direction. The motor 40 includes an output shaft 41 which is protruded vertically upwards and a motor pulley 22b is attached to the output shaft 41. A belt (not shown) is applied to the motor pulley 22b and the rotation of the motor pulley 22b is transmitted to the rotation shaft member pulley 22a through the belt.

A motor brake 42 which prevents the rotation of the output shaft 41 is attached to the upper end of the output shaft 41. In the embodiment, the motor brake 42 is attached to the upper end of the output shaft 41 by a bolt 42a and the elongated object is attached as a communication line and a power line (not shown). That is, when a signal as a designation for preventing the rotation of the output shaft 41 is transmitted to the motor brake 42 by the elongated object, the motor brake 42 is driven by power and a frictional force is operated on a member connected to the output shaft 41. As a result, rotation of the output shaft 41 is prevented. With this configuration, in the robot 10, it is possible to stop the rotation (or prevent rotation) of the output shaft 41 of the motor 40 at an arbitrary timing.

Meanwhile, in a motor of the related art, a motor brake is attached to a main body of a motor. For example, in a motor having a longitudinal direction set to face the vertical direction as shown in FIG. 3A, the motor brake is attached to a bottom surface (position Pb shown in FIG. 3A) of the motor main body or an upper surface (position Pt shown in FIG. 3A) of the motor main body. In this case, the motor pulley 22b is necessarily moved upwards by the height of the motor brake.

In a configuration in that the rotation driving force of the motor 40 is transmitted to the first arm 11 through the motor pulley 22b, the rotation shaft member pulley 22a, and the belt, it is possible to configure so that the motor 40 is disposed vertically downwards through the belt and the first arm 11 is disposed vertically upwards (for example, in the configuration shown in FIGS. 1A and 1B, the first arm 11 is disposed over the reduction gear 50 and the motor 40 is disposed on the rectangular portion 20b of the base 20). According to this configuration, the first arm 11 (reduction gear 50) and the motor 40 are not lined on the vertical line, and a lower space of the first arm 11 can be used as a space where components other than the motor 40 exist. Accordingly, it is possible to increase a length of the elongated object 30 including a portion present in the base 20 and in the first arm 11, which extends along the rotation shaft $Ax_1$. As the length of the elongated object 30 extending in a linear shape is long, it is possible to prevent aged deterioration in a case where the elongated object 30 is twisted, and it is possible to provide a long life time of the elongated object 30.

In the configuration described above, the reduction gear 50 and the first arm 11 are disposed at a position different from the directly upper portion of the motor 40. Accordingly, the entire height of the base does not change, even when a member smaller than the reduction gear 50 is disposed over the motor 40. Since it is easy to configure the motor brake 42 which is smaller than the reduction gear 50, by configuring the motor brake 42 vertically upwards with respect to the motor pulley 22b, as shown in FIGS. 3A and 3B, it is possible to configure the base 20 including the motor brake 42, without increasing the size of the base. The motor brake 42 can employ various configurations and can be configured with well-known various type brake.

By processing the arrangement of the elongated object in the base 20, the elongated object may be configured so as to prevent the shortening of the life time of the elongated object. For example, in the robot 10 including a driving unit (a motor, a pulley, a rotation shaft member and the like) which exists in the base 20 and is for rotating the first arm 11, a configuration in that the base 20 includes an opening and a cover attachable to the opening, the cover includes an elongated object connection unit for connecting the elongated object 30 present in the base 20 to a connection portion of the outside of the base 20, the elongated object 30 includes a piping for flowing fluid, the linear connection unit includes a joint where piping is connected, and the driving unit does not exist in an extended edge of the joint of the cover attached to the opening.

Figure 4A:
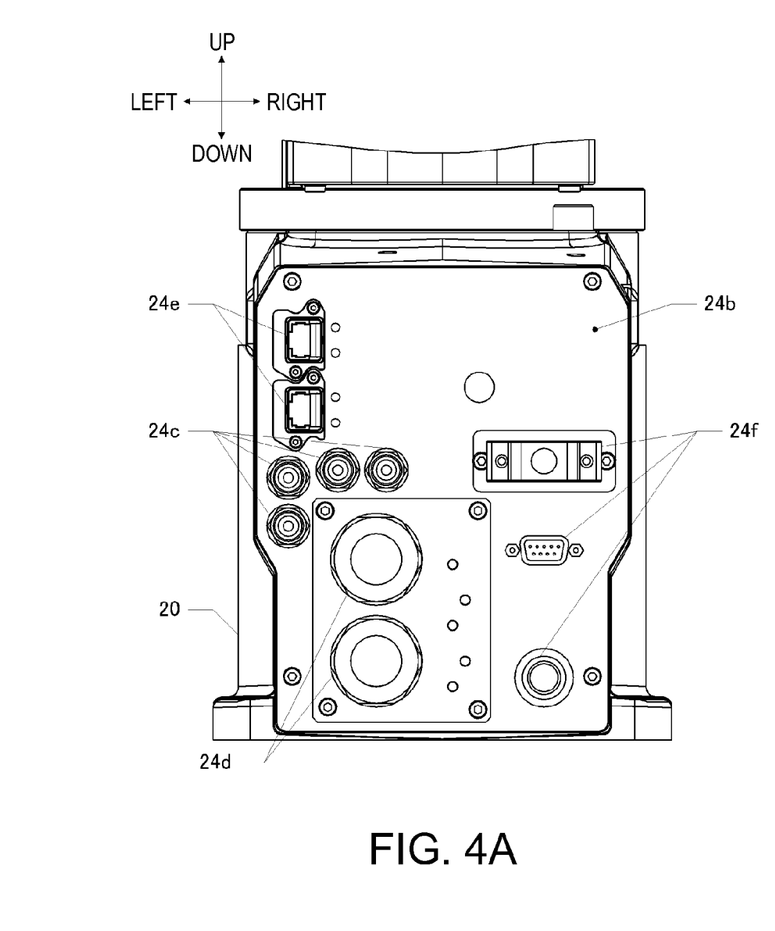
FIG. 4A is a diagram showing the base and FIG. 4B is a diagram showing the inside of the base.
Figure 4B:
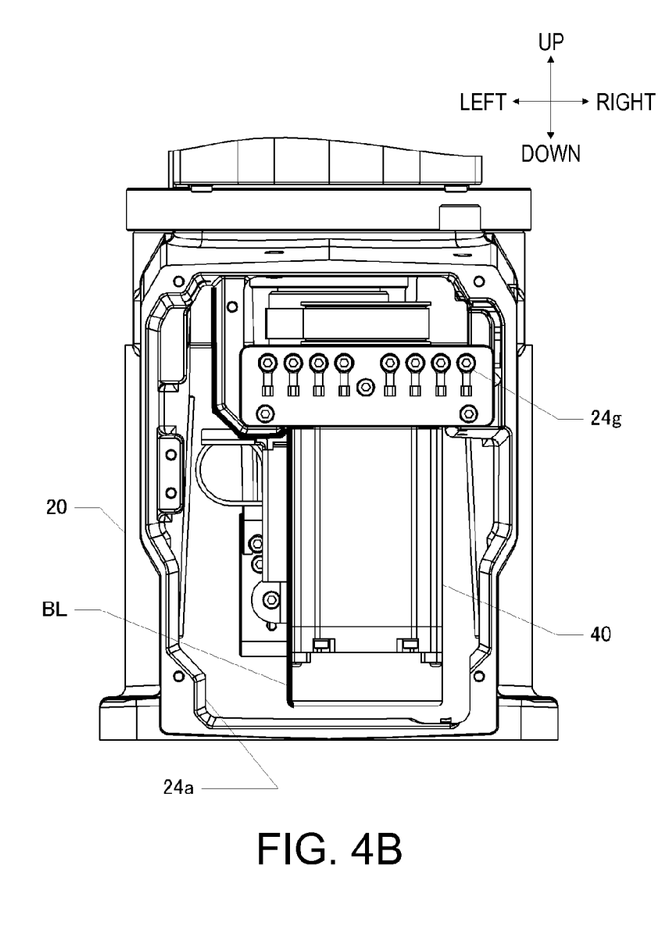

FIGS. 4A and 4B are diagrams showing a state where the base 20 is seen from the rear side. In the base 20 shown in the drawings, an opening 24a is formed on a rear surface. It is possible to attach a cover 24b covering the opening 24a on the base 20. A plurality of elongated object connection units 24c to 24f are attached to the cover 24b. The elongated object connection units 24c to 24f are attached so as to extend in a direction vertical to the plane of the cover 24b. The elongated object connection unit 24c is a joint to which a piping is connected, the elongated object connection unit 24d is a connector to which an electrical line is connected, and the elongated object connection unit 24e is a connector to which a communication line is connected. The elongated object connection unit 24f is a connector of the elongated object which is not used in the managing process of the robot 10 or a connector of the elongated object of which bending is not an important factor (not elongated object bound by the plurality of elongated objects, but elongated object which exists by separating the plurality of elongated objects).

The base 20 includes a driving unit such as the motor 40 therein. Main parts of the driving unit is covered with sheet metal or the like, and FIG. 4B shows a boundary of the driving unit which is a boundary existing on the elongated object connection units 24c to 24d side with a bold straight line BL. When the elongated object 30 comes into contact with the driving unit, the life time may be shortened by damaging the elongated object 30 due to the driving of the driving unit. When the driving unit exists in the extended edge of the elongated object connection unit (extended edge of the elongated object to the elongated object connection unit in a connection direction) in a state where the cover 24b is attached to the opening 24a, it is necessary to curve the elongated object 30 in the base 20 for avoiding the driving unit.

Therefore, in the embodiment, it is configured so that the driving unit does not exist in the extended edge of the elongated object connection units 24c to 24e (when the elongated object connection units 24c to 24e are projected on FIG. 4B, the projected diagram is the left side with respect to the bold straight line BL). Accordingly, the elongated object 30 connected to the elongated object connection units 24c to 24e is not greatly curved in order to avoid interference with respect to the driving unit in the base 20. Accordingly, it is possible to prevent reduction in life time of the elongated object 30. The piping as the elongated object 30 is difficult to be sharply curved for ensuring flow of fluid in the piping. Accordingly, the configuration of the embodiment in that the driving unit does not exist in the extended edge of the elongated object connection units is applied to the elongated object connection unit 24c connecting the piping, and accordingly the effects thereof are significantly realized.

The elongated object connection units for connecting the elongated object for which the interference of the driving unit is hardly assumed, may be attached to the cover 24b in a state where the driving unit exists in the extended edge. For example, the elongated object connection unit 24f shown in FIG. 4A is a connector of the elongated object not used in the managing process of the robot 10 and a connector of the elongated object of which bending is not an important factor. That is, in the former case, the elongated object does not interfere the driving unit, even through the driving unit exists in the extended edge of the elongated object connection unit. In the letter case, it is possible to draw the elongated object so as to avoid the driving unit, because a degree of freedom for drawing the elongated object is high. In addition, in a case of the elongated object connected to the constituent elements of the driving unit, the configuration in that the driving unit does not exist in the extended edge of the elongated object connection unit may not be used. The elongated object connection unit of the elongated object connected to a connector 24g of an earth line shown in FIG. 4B may be attached to the cover 24b so that the connector 24g or the driving unit exists in the extended edge.

The entire disclosure of Japanese Patent Application No. 2014-200029, filed Sep. 30, 2014 is expressly incorporated by reference herein.

What is claimed is:

1. A robot comprising:
   a base;
   a first arm which is provided to be rotatable with respect to the base using a predetermined first rotation shaft as a center of rotation;
   a second arm fixed to the first arm and provided to be rotatable with respect to the first arm using a predetermined second rotation shaft that is orthogonal to the first rotation shaft;
   an elongated object including a portion present in the base and in the first arm, wherein the elongated object is bound in a first binding position which is on the first rotation shaft and in the base and a second binding position which is on the first rotation shaft and in the first arm;
   a hollow rotation shaft member which includes a portion present in the base and in the first arm and rotates using the first rotation shaft as the center of rotation, wherein the elongated object passes through the hollow portion of the rotation shaft member; and
   a reduction gear including a hollow axis which is attached to at least one of the base and the first arm, wherein the rotation shaft member penetrates through the hollow axis of the reduction gear,
   wherein a motor including an output shaft facing an upper portion in a vertical direction, a motor pulley which is attached to the output shaft, a rotation shaft member pulley through which the first rotation shaft penetrates, and a belt attached to the motor pulley and the rotation shaft member pulley are included in the base, and
   the reduction gear and the first arm exist vertically upwards with respect to the rotation shaft member pulley.

2. The robot according to claim 1,
   wherein the elongated object has a linear shape between the first binding position and the second binding position.

3. The robot according to claim 1,
   wherein the first rotation shaft is parallel to a vertical direction.

4. The robot according to claim 1, further comprising:
   a motor brake which is attached to the output shaft in a portion vertically upwards with respect to the motor pulley and prevents the rotation of the output shaft.

5. The robot according to claim 1,
   wherein a removal prevention member for preventing removal of a bearing of the rotation shaft member pulley is attached to the first rotation shaft in a portion vertically downwards with respect to the rotation shaft member pulley.

6. The robot according to claim 1, further comprising:
   a circular sealing member for preventing leakage of oil in the reduction gear; and
   a circular removable member which is detachable from the reduction gear and is attached to the reduction gear in a state of being penetrated by the first rotation shaft to be disposed between the sealing member and the reduction gear.

7. The robot according to claim 1, further comprising:
   a driving unit which exists in the base and rotates the first arm,
   wherein the base includes an opening and a cover which is attachable to the opening,
   the cover includes an elongated object connection unit for connecting the elongated object existing in the base to a connection portion of the outside of the base,
   the elongated object contains piping for flowing fluid,
   the elongated object connection unit contains a joint to which the piping is connected, and
   the driving unit does not exist in an extended edge of the joint of the cover attached to the opening.

* * * * *